Figure 1:
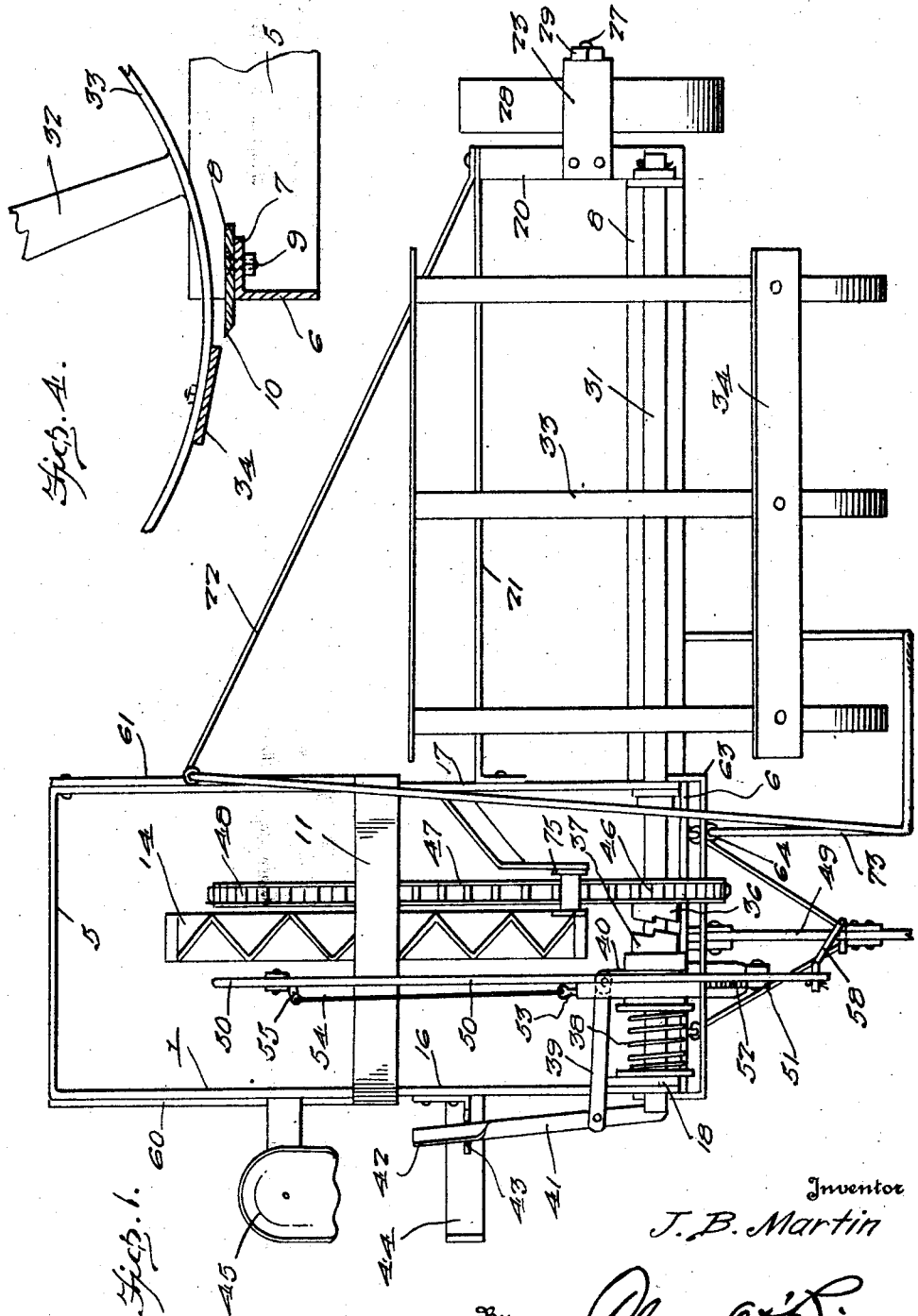

Jan. 26, 1926.  
J. B. MARTIN  
STALK CUTTER  
Filed June 5, 1925  
1,570,850  
3 Sheets-Sheet 1

Inventor  
J. B. Martin

Jan. 26, 1926. 1,570,850
J. B. MARTIN
STALK CUTTER
Filed June 5, 1925 3 Sheets-Sheet 2

Inventor
J. B. Martin
By Clarence O'Brien
Attorney

Jan. 26, 1926. 1,570,850
J. B. MARTIN
STALK CUTTER
Filed June 5, 1925 3 Sheets-Sheet 3

Fig.3.

Inventor
J. B. Martin
By
Clarence O'Brien
Attorney

Patented Jan. 26, 1926.

1,570,850

UNITED STATES PATENT OFFICE.

JEROME B. MARTIN, OF GRANITE, OKLAHOMA.

STALK CUTTER.

Application filed June 5, 1925. Serial No. 35,173.

*To all whom it may concern:*

Be it known that I, JEROME B. MARTIN, a citizen of the United States, residing at Granite, in the county of Greer and State of Oklahoma, have invented certain new and useful Improvements in a Stalk Cutter, of which the following is a specification.

The present invention relates to a stalk cutter, and has for its principal object to provide a wheeled structure which will cut down a plurality of rows of corn stalks, or the like, in one operation.

Another important object of the invention is to provide a machine of this nature which is exceptionally light in its construction, yet strong and durable.

Another very important object of the invention is to provide a machine of this nature which may be adjusted so as to cut the stalks at different heights from the ground as may be desired.

A still further very important object of the invention is to provide a machine of this nature which is comparatively simple in its construction, not likely to easily become out of order, and otherwise well adapted to the purpose for which it is designed.

With the above and numerous other objects in view as will appear as the description proceeds the invention resides in certain novel features of construction, and in the combination and arrangement of parts as will be hereinafter more fully described and claimed.

In the drawings:—

Figure 2:
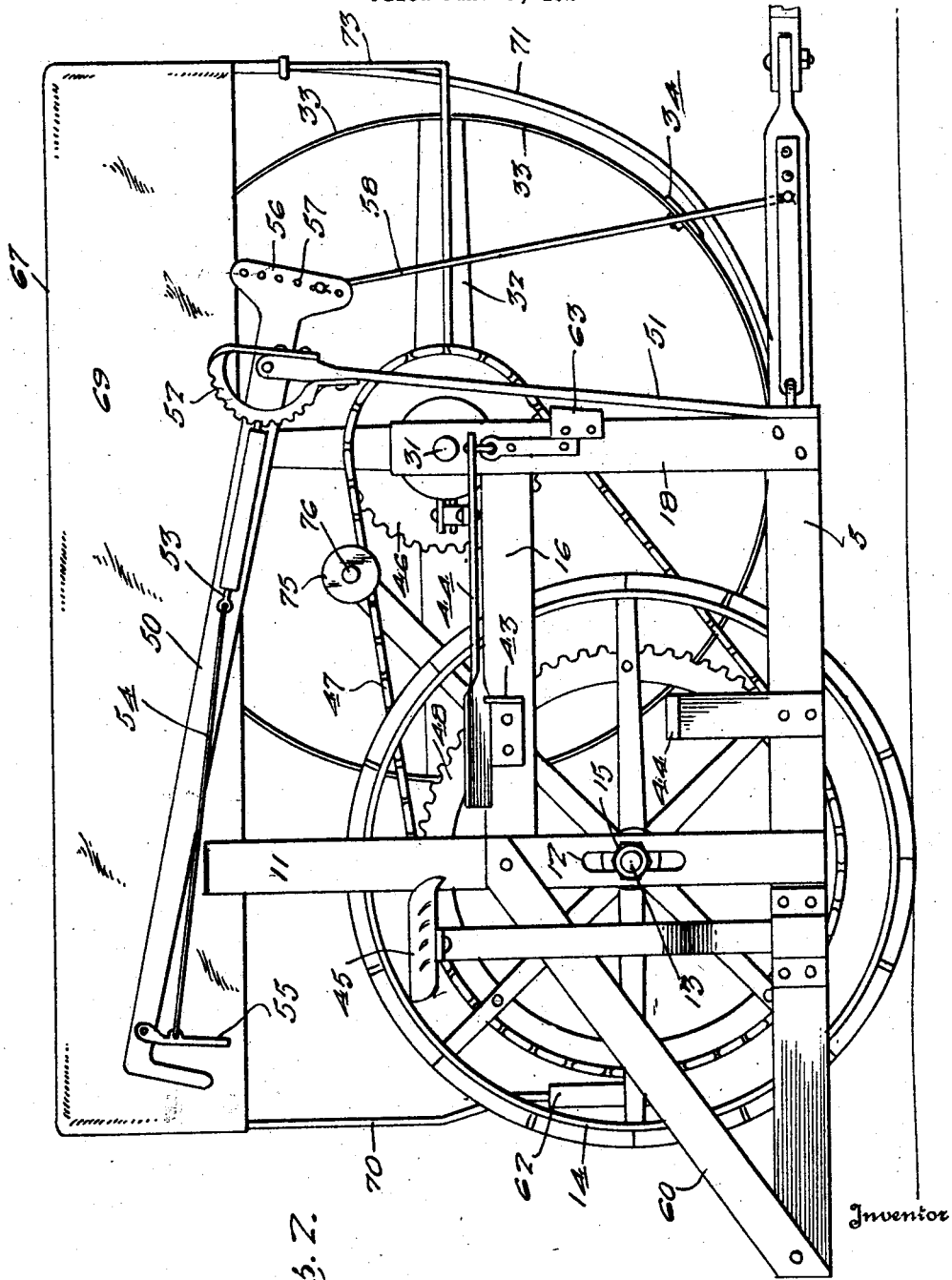

Figure 1 is a top plan view of the machine embodying the features of my invention, Figure 2 is a side elevation thereof, Figure 3 is a front elevation thereof, and Figure 4 is an enlarged detailed sectional view showing the cutter blade, and a portion of the means for moving the stalks into engagement therewith.

Referring to the drawing in detail, it will be seen that the wheel supported structure of this machine includes a U-shaped bottom frame 5 which extends longitudinally of the path of movement of the machine, and has its front ends fixed to a transversely disposed beam 6, which extends to one side of the frame 5, and has its upper edge bent over angularly as at 7 so that the cutter blade 8 may be fixed thereto by bolts 9, or in any other suitable manner, and so that the cutting edge 10 of the cutter blade is disposed forwardly of the beam, as may be seen to advantage in Figure 4. A super structure is mounted on the frame 5 and consists of an inverted U-shaped frame 11, vertically disposed and having its ends fixed to intermediate portions of the sides of the frame 5. The sides of this frame 11 have vertically extending slots 12 provided therein through which extends the axle 13 of a bull wheel 14 whereby the axle may be held in different adjusted positions in relation to the frame 11 by means of nuts 15. Bars 16 and 17 are attached to intermediate portions of the sides of the frame 11 and extend forwardly and horizontally being attached to uprights 18, which are fixed to and rise from the forward ends of the frame 5. A frame 20 is fixed to the end of the beam 6 and is braced in relation to the frame 5 by rods 21 and 22. An inverted L-shaped bar 23 is fixed to the top of the frame 20 and the depending or vertical portion thereof is slotted as at 24 while a vertical bar 25 mounted in the frame 20 is also slotted at 26. The axle 27 of a wheel 28 extends through the slots 24 and 26 and is held in different adjusted positions by means of nuts or the like 29. It will thus be seen that the height of the machine from the ground may be varied by the adjustments just described incident to the wheel 28 and its axle 27, and as previously described in connection with the bull wheel 14 and its axle 13. A bracket 30 rises from the frame 20, and a shaft 31 is journaled in this bracket and through uprights 18 so as to extend transversely of the machine. A plurality of sets of spokes 32 radiate from the shaft at suitable spaced intervals between the frame 20 and the frame 5 and its superstructure. Hoops or rims 33 are mounted on the sets of spokes 32 and have fixed thereto a plurality of bars 34 disposed parallel to the axis of the shaft 31 and circumferentially spaced about the rims. When the shaft 31 is rotated as will be hereinafter described, the bars 34 will travel over top of a number of stalks and then force the bottom portions of the stalks against the cutting edge of the blade 8 as said blade 8 is moving forwardly with the machine.

A clutch element 36 is rotatably mounted on the shaft 31 independently thereof. A clutch element 37 is splined (not shown) on the shaft 31 in a well known manner, and is normally held in engagement with the element 36 by a spring 38. A link 39 is attached to a band 40 disposed about the element 37 and is also pivoted to a lever 41 pivoted on one of the uprights 18. This lever 41 is provided at its free end with an upstanding flange 42. The free end of the lever is associated with a notched bracket 43 in order that it may be held in either a released or engaged position. A foot rest 44 is supported on the frame 5 and the free end of the lever 41 is located adjacent thereto so that the driver on the seat 45 may easily actuate this lever for releasing or engaging the clutch elements 36 and 37. The clutch element 36 has a sprocket 46 fixed thereto over which is trained a chain 47 also trained over a sprocket 48 fixed to the bull wheel 14 in any suitable manner. The bull wheel, therefore, when the machine is traveling forwardly, will cause the rotation of the shaft 31 when the clutch elements 36 and 37 are engaged.

A draft appliance 49 is pivotally attached to the beam 6 in front of the frame 5 and may be attached to a tractor or any other draft means. A lever 50 is pivoted to the upper end of a bar 51 which extends upwardly from the beam 6 intermediate the front ends of the frame 5. This bar 51 has a notched segment 52 mounted thereon with which cooperates a dog 53 slidably mounted on the lever and controlled through link 54 and the pivoted member 55. The end 56 of the lever 50 is provided with a series of openings 57 with which a link rod 58 may be engaged. The lower end of this link rod is attached in any suitable manner to the draft appliance 49, and thus the angle of the draft appliance to the machine may be changed, thereby rocking the machine either forwardly or rearwardly for making slight changes in the heights of the cutter blade 8 from the ground.

Brace bars 60 and 61 extend from intermediate portions of the sides of the vertical frame 11 to the rear end of the frame 5, and the brace bar 60 supports a socket 62. A bar 63 extends across the intermediate portions of the uprights 18 and supports a socket 64. A socket 65 is suppported intermediate the ends of the beam 6, approximately at the center thereof, and extends forwardly. A guard 67 preferably of canvas is substantially L-shaped in top plan view so as to provide a front relatively short portion 68, and a longitudinally extending portion 69. This guard is supported on a frame which includes the rod 70 in the socket 62, the curved rod 71 having its end disposed in the socket 65 and the rod 73 having its end engaged in the socket 64. This guard prevents the severed stalks from being knocked over upon the driver sitting on the seat 45. An idler roller 75 is journaled on a rod 76 supported by the bar 17, and engages the chain 47.

With this machine it is possible to pull the same along by a tractor or other draft means so as to cut down several rows of corn stalks or the like simultaneously. Because of the comparative lightness of the machine, very little power will be used in the draft appliance, and this stalk cutting operation may be economically accomplished. It is thought that the construction, operation, and advantages of the machine will now be clearly understood without a more detailed description thereof.

It is desired, however, to point out that the present embodiment of the machine has been disclosed merely by way of example and attains all the features of advantage enumerated as desirable in the statement of the invention and above description. It will further be apparent that numerous changes in the details of construction, in the combination and arrangement of parts may be resorted to without departing from the spirit of the invention or the scope of the invention as hereinafter claimed or sacrificing any of its advantages.

Having thus described the invention, what I claim as new and desire to secure by Letters Patent is:—

1. A machine of the class described including a longitudinally extending U-shaped frame having its ends disposed forwardly, a beam extending across the ends and beyond one side of the frame, a cutter bar on the beam, a frame at the end of the beam, wheels journaled in the frames, a shaft journaled between the frames, means operatively connecting the shaft with one of the wheels, a clutch mechanism associated with said means, a plurality of bars disposed in spaced circumferential relationship about the axis of the shaft, means operatively connecting the bars with the shaft, means for tilting the frames so as to vary the distance of the beam from the ground.

2. A machine of the class described including a longitudinally extending U-shaped frame having its ends disposed forwardly, a beam extending across the ends and beyond one side of the frame, a cutter bar on the beam, a frame at the end of the beam, wheels journaled in the frames, a shaft journaled between the frames, means operatively connecting the shaft with one of the wheels, a clutch mechanism associated with said means, a plurality of bars disposed in spaced circumferential relationship about the axis of the shaft, means operatively connecting the bars with the shaft, means for tilting the frames so as to vary the distance of the beam from the ground, a seat on the first mentioned frame, and a guard supported on the frame and beam for preventing the severed stalks from hitting a person on the seat.

3. A stalk cutter of the class described including, in combination, a horizontally disposed U-shaped frame having its sides extending forwardly from its intermediate portion, a bar extending transversely across the ends of the U-shaped frame beyond one side thereof, a portion of the edge of said bar beyond the frame being bent rectangularly to form a horizontally disposed flange, a cutter bar fixed to said flange, uprights associated with the frame, an upright associated with the bar, a reel having a shaft journaled in said uprights, an inverted U-shaped frame having its ends fixed to intermediate portions of the sides of the first U-shaped frame, a wheel journaled between the sides of the second U-shaped frame, and means operatively connecting the shaft and said wheel.

In testimony whereof I affix my signature.

JEROME B. MARTIN.